United States Patent [19]  
Pierson et al.

[11] 4,134,747  
[45] Jan. 16, 1979

[54] METHOD OF FORMING TRANSPARENT AND OPAQUE PORTIONS IN A REDUCING ATMOSPHERE GLASS

[75] Inventors: Joseph E. Pierson; Stanley D. Stookey, both of Painted Post, N.Y.

[73] Assignee: Corning Glass Works, Corning, N.Y.

[21] Appl. No.: 778,161

[22] Filed: Mar. 16, 1977

[51] Int. Cl.$^2$ ............... C03C 15/00; C03B 32/00; C03C 3/04
[52] U.S. Cl. ............... 65/30 R; 65/32; 65/33; 65/DIG. 2; 106/52; 106/DIG. 6
[58] Field of Search ............... 65/DIG. 2, 30 R, 33, 65/32; 106/DIG. 6, 52

[56] References Cited

U.S. PATENT DOCUMENTS

| | | | |
|---|---|---|---|
| 2,515,937 | 7/1950 | Stookey | 65/DIG. 2 |
| 2,515,942 | 7/1950 | Stookey | 65/DIG. 2 |
| 2,515,943 | 7/1950 | Stookey | 65/DIG. 2 |
| 3,788,865 | 1/1974 | Babcock et al. | 65/33 X |
| 3,902,881 | 9/1975 | Pirooz | 65/32 X |

OTHER PUBLICATIONS

J. Ceram. Assoc., Japan, 1959 — Fundamental Studies on the Photosensitive Glass, pp. 263 to 269.
J. Ceram. Assoc. Japan, 1960 — Behavior of Cerium Ions in Glasses Exposed to X-Rays, pp. 169 to 173.

*Primary Examiner*—S. Leon Bashore
*Assistant Examiner*—Frank W. Miga

*Attorney, Agent, or Firm*—Clinton S. Janes, Jr.; Clarence R. Patty, Jr.

[57] ABSTRACT

This invention is concerned with the preparation of glass articles wherein a portion thereof is opaque and another portion thereof is transparent and, optionally, integrally colored. The opaque portion is produced through the thermal reduction and precipitation of a controlled number of submicroscopic particles of at least one metal selected from the group of copper, gold, palladium, platinum, and silver with the subsequent nucleation and growth of NaF crystals on said metal particles to a size sufficient to scatter visible light. The transparent portion is developed through the photoreduction of at least one photosensitive metal selected from the group of copper, gold, and silver to produce additional submicroscopic particles of said metals upon which NaF crystals are nucleated and grown, but which remain in a size too small to scatter visible light. The presence of copper or gold alone gives rise to a single color, whereas the inclusion of silver permits a full spectrum of colors to be produced.

Where silver is present, microcrystals of NaF containing a silver halide selected from the group of AgCl, AgBr, and AgI are grown upon which a coating of metallic silver is developed or within which metallic silver is deposited.

The method involves sequences of exposures of the glass to high energy or actinic radiation followed by heat treatments.

36 Claims, No Drawings

METHOD OF FORMING TRANSPARENT AND OPAQUE PORTIONS IN A REDUCING ATMOSPHERE GLASS

BACKGROUND OF THE INVENTION

U.S. Pat. Nos. 2,515,936, 2,575,943, and 2,651,145 describe the manufacture of transparent and thermally opacifiable photosensitive glasses.

U.S. Pat. No. 2,515,936 discloses the preparation of transparent, colored glasses having base compositions within the alkali metal-alkaline earth metal-silica field containing silver and $CeO_2$ as a sensitizing agent. The glass is exposed to such shortwave radiations as ultraviolet radiations, X-radiations, and radioactive radiations and thereafter heated to about 470°–500° C. Colloidal particles of silver are developed which imparted color to the glass.

U.S. Pat. No. 2,575,943 describes thermally-opacifiable, photosensitive glasses having base compositions within the $Na_2O$-$Al_2O_3$-$SiO_2$-F system containing gold and $CeO_2$ as a sensitizing agent. The glass is subjected to shortwave radiations and then heated to a temperature between about 100° C. below the softening point of the glass to about 50° C. above the softening point. That treatment gives rise to the development of colloidal gold nuclei. The nucleated glass is cooled to below 520° C. to effect the formation of NaF nuclei on the colloidal gold particles, and thereafter the glass is heated to about 520°–570° C. to cause the NaF crystallites to grow to sufficient size to scatter visible light. The opaque area of the glass was commonly white in color although the occurrence of a pink tint was mentioned.

U.S. Pat. No. 2,651,145 was concerned with thermally-opacifiable, photosensitive glasses having base compositions within the $Na_2O$-$Al_2O_3$-$SiO_2$-F field containing silver and $CeO_2$. The glass was exposed to shortwave radiations and subsequently heated to a temperature between about 150° C. below the softening point of the glass to about 50° C. thereabove. Colloidal silver nuclei were developed thereby. The nucleated glass was cooled below 500° C. to form NaF nuclei on the metallic silver particles. The glass was thereafter heated to a temperature no lower than 100° C. below the softening point of the glass to cause the NaF nuclei to grow to a sufficient size to scatter visible light. Differently colored opacified articles could be produced by varying the shortwave exposure time and the time and/or temperature of the first heating step.

Whereas those patents indicated that colored transparent and opacified (opal) glasses could be produced from glasses containing photosensitive metals, control of the colors produced was extremely difficult and there was the desire to be able to obtain a full spectrum of colors in a single glass composition.

These circumstances led to U.S. application Ser. No. 646,259, now Pat. No. 4,017,318, filed Jan. 2, 1976 by J. E. Pierson and S. D. Stookey, which discloses the preparation of photosensitive colored glasses or polychromatic glasses, as they have been variously denominated. That application describes two general methods for the production of such glasses, each method comprehending a series of irradiation and heat treating steps. A wide range of base glass compositions is operable in the invention but, as essential ingredients, each must include silver, an alkali metal oxide which is preferably $Na_2O$, fluoride, and at least one halide selected from the group of chloride, bromide, and iodide. The glass articles are irradiated with high energy or actinic radiations selected from the group of high velocity electrons, X-radiations, and ultra-violet radiations having wavelengths within the range of about 2800Å–3500Å. The heat treatments contemplate exposing the glass articles to temperatures between about the transformation range up to about the softening point thereof. Where ultra-violet radiation comprises the effective actinic radiation, $CeO_2$ is a required constituent of the glass composition.

In the first general method disclosed therein, the glass article is initially exposed to high energy or actinic radiations, which exposure causes the development of a latent image in the glass. The time and intensity of this first exposure serves to determine the final color which will be produced in the glass. Subsequently, the exposed glass article is subjected to a heat treatment which effects the precipitation of colloidal silver particles in situ to function as nuclei. Where a colored transparent glass article is sought, this heat treatment will be conducted for only so long as to cause the precipitation of colloidal silver and to occasion the growth thereon of extremely small microcrystals of alkali metal fluoride-silver halide, e.g., NaF + (AgCl and/or AgBr and/or AgI). Where a colored opal glass article is desired, this heat treatment will be extended for a length of time adequate to not only effect the precipitation of colloidal silver nuclei, but also to cause the growth of said microcrystals on the silver nuclei to a large enough size to scatter light. Thus, the opacity is developed in the exposed portions of the glass article with the unexposed portions, if any, remaining clear.

The so-nucleated glass article is thereafter cooled to a temperature at least 25° C. below the strain point of the glass, conveniently to ambient or room temperature, and then again exposed to high energy or actinic radiation. This second exposure serves to intensify the color which will subsequently be developed, the hue of which was determined previously through the first exposure. Finally, the glass article is again heated to a temperature at least about the transformation range of the glass and up to about the softening point thereof to produce the desired color in the glass. The inventors hypothesized that this final heat treatment caused the precipitation of submicroscopic particles of silver, either as discrete colloidal particles and/or deposited on the surface and-/or deposited within the alkali metal fluoride-silver halide microcrystals.

Whereas the mechanism of the color phenomenon is not totally understood, it is believed to be a function of the quantity of silver precipitated and the geometry thereof, as well as, perhaps, the refractive index of the crystals. Furthermore, inasmuch as the colors can be secured with very low contents of silver and illustrate characteristics akin to interference colors, it has been conjectured that at least one of the three following circumstances is present: (1) discrete colloidal particles of silver less than about 200Å in the smallest dimension; (2) metallic silver deposited within the alkali metal fluoride-silver halide microcrystals, the silver-containing portion of the microcrystals being less than about 200Å in the smallest dimension; and (3) metallic silver deposited upon the surface of said microcrystals, the silver-coated portion of the microcrystals being less than about 200A in the smallest dimension.

The inventors then observed that the heat treatment after each exposure to high energy or actinic radiation could desirably take the form of a series of heatings and coolings instead of a single treatment as set out above. Such additional treatments do not alter the color developed but can intensify the color produced.

The second fundamental method for producing colored glasses outlined in the above application disclosed the preparation of glasses exhibiting a single color, this color being capable of being varied over the entire range of the visible spectrum. Glass batch compositions similar to those described above with respect to the first method are also useful here, but such will also contain a thermoreducing agent, desirably SnO and/or $Sb_2O_3$. The method involves four basic steps:

First, a glass-forming batch of the desired composition and containing a thermoreducing agent is melted and formed into a glass article;

Second, the glass article is subjected to a heat treatment at temperatures between about the transformation range of the glass and the softening point thereof for a period of time sufficient to induce reduction of part of the silver content to colloidal silver particles, thereby acting as nuclei, and to cause the growth of alkali metal fluoride-silver halide microcrystals thereupon;

Third, the nucleated glass article is cooled to at least 25° C. below the strain point of the glass and exposed to high energy or actinic radiation;

Fourth, the glass article is reheated to a temperature between about the transformation range of the glass and the softening point thereof to effect the precipitation of submicroscopic particles of silver, either as discrete colloidal particles and/or deposited on the surface and/or deposited within the alkali metal fluoride-silver halide microcrystals.

The color to be developed within the glass is determined by the extent of thermal reduction in the second step, and the intensity of the color is affected by the parameters of the third and fourth steps. The use of a series of heat treatments, either after the initial heat treatment to effect thermoreduction or after the exposure to high energy or actinic radiation, can be useful in intensifying the final color produced. Thus, whereas the reaction mechanism at work is not completely understood, it appears that two or more consecutive heat treatments at temperatures between about the transformation range and the softening point of the glass, separated by cooling to below the transformation range, lead to a more vivid final color than a single heat treatment of equal or longer duration.

The application also pointed out that the sequence of colors produced seemed to be similar with both general methods. Hence, in the first method wherein two exposures to high energy or actinic radiation were involved, the briefest initial exposure provided for the development of a green color, followed by blue, violet, red, orange, and yellow as the exposure time and/or intensity is increased. In like manner, the least amount of thermal reduction will result in a green glass and the most will yield a yellow glass.

U.S. application Ser. No. 778,160, filed concurrently herewith by Joseph Ference, discloses an improvement upon the method described in application Ser. No. 646,259. That improvement comprises combining the exposure to high energy or actinic radiation and heat treatment into a single step. Thus, the exposure is conducted while the glass article is at a temperature between about 200°–410° C. The invention is operable over the broad range of glass composition recited in application Ser. No. 646,259, and is particularly advantageous in producing a similar product while both reducing the treatment time required to achieve a colored glass article and improving the intensity of the color developed.

SUMMARY OF THE INVENTION

As was observed above with respect to U.S. Pat. Nos. 2,515,936, 2,515,943, and 2,651,145 and to application Ser. No. 646,259, supra, the development of color and/or opacity in those articles took place in those portions thereof which had been subjected to high energy or actinic radiation. We have now discovered certain glass compositions which produce "reverse" opals, i.e., the glasses develop a white or single color opacity in those portions thereof that are not exposed to high energy or actinic radiation and remain transparent and, optionally, can be colored in those portions so exposed.

Where a simple "reverse" opal glass is desired, i.e., a glass wherein the opacified area is white or of a single color and the transparent portion is essentially uncolored or of a single color, the composition thereof will contain $Na_2O$, $SiO_2$, F, a compound containing at least one thermally reducible ion selected from the group of copper, gold, silver, palladium, and platinum, a compound containing at least one photoreducible ion selected from the group of copper, gold, and silver, and a thermoreducing agent which will preferably be SnO and/or $Sb_2O_3$. Where ultra-violet radiation having wavelengths between about 2800–3500Å comprises the actinic radiation, $CeO_2$ will be included in the composition. As is apparent, copper, silver, and gold have the dual capability of being subject to thermal reduction and photoreduction so, therefore, their utility in satisfying both functions of the reducing mechanism renders their use the preferred embodiment.

One method for preparing the simple "reversible" opals contemplates four basic steps:

First, a batch of the proper composition is melted and shaped into a transparent glass article of a desired configuration having submicroscopic particles of a metal selected from the group of Ag, Au, Cu, Pd, and Pt dispersed therein;

Second, a portion of the glass article is exposed to high energy or actinic radiation at ambient temperature for a sufficient length of time to develop a latent image therein;

Third, the glass article is heated to a temperature between about the transformation range of the glass and the softening point thereof for a sufficient length of time to (1) cause the growth of NaF crystals on said submicroscopic particles of at least one metal selected from the growth of Ag, Au, Cu, Pd, and Pt in the unexposed portion of said article to a sufficient size to scatter visible light, and (2) to cause nucleation and growth of microcrystals of NaF in said exposed portion of said article of insufficient size to scatter visible light; and Fourth, the article is cooled to ambient or room temperature.

The operable glasses are characterized as being in a partially reduced condition with respect to the nucleating metal and containing a controlled low concentration of metal nuclei (generally about $10^{12}$–$10^{15}/cm^3$) resulting from the thermal reduction of Ag-, Au-, Cu-, Pd-, and/or Pt-containing compounds as the melt is being cooled and shaped into a glass article. To insure satisfactory nucleation, the molten mass may be maintained at a temperature somewhat above the softening point of the glass for a period of time before shaping and cooling a glass article therefrom. Alternatively, the glass article may be reheated to a temperature above the softening point of the glass for a period of time and then cooled.

Upon heat treatment of the glass article after a portion thereof has been exposed to high energy or actinic radiation, NaF crystals grow in the unexposed portion of the article on the metal nuclei to a sufficient size to scatter light, commonly between about 1-10 microns, thereby imparting dense opacity thereto.

Where a relatively large amount of a silver-containing compound is employed for thermal reduction, the opal portion of the article may take on a yellow hue; copper can produce a red tint; and gold can lead to a red or blue color.

In contrast, heat treatment of the exposed portion of the glass article can result in total transparency. Hence, by governing the amount of exposure to which the glass is subjected, the subsequent heat treatment leaves a portion which is transparent. In general, the longer and/or more intense the exposure, the more transparent the exposed portion becomes after heat treatment. Although the reaction mechanism giving rise to this phenomenon has not been rigorously proved, the following is believed to provide a sound explanation.

The exposure to high energy or actinic radiation produces a large number of metal nuclei (in general greater than $10^{15}/cm^3$) through photoreduction of Ag-, Au-, and/or Cu-containing compounds, these being present in addition to the metal nuclei formed through the thermal reduction of the Ag-, Au-, Cu-, Pd-, and/or Pt-containing compounds. As a result, the number of growing NaF crystals becomes so great that each competes with its neighbors for the available fluoride ions. Because of this, the growth of the NaF crystals to sufficiently large dimensions to scatter light, and thereby induce opacity in the glass, is inhibited.

In like manner to the opal phase, the use of a relatively large amount of silver can yield a yellow tint to the transparent portion of the glass article; copper can produce a reddish hue; and gold can result in a red or blue color.

Where a "reverse" opal glass is desired wherein the transparent portion thereof can be variously colored, the base composition must include a silver-containing compound and will also contain a halide selected from the group of chloride, bromide, and iodide. Two additional steps must be added to the method described above for the simple "reverse" opals.

Hence, one method for achieving this embodiment of the invention contemplates six general steps:

(1) a batch of the proper composition is melted and shaped into a transparent glass article of a desired configuration having submicroscopic particles of Ag and, optionally, of a metal selected from the group of Au, Cu, Pd, and Pt dispersed therein;

(2) a portion of the glass article is exposed to high energy or actinic radiation at ambient temperature for a sufficient length of time to develop a latent image therein;

(3) the glass article is heated to a temperature between about the transformation range of the glass and the softening point thereof for a sufficient length of time to (a) cause the growth of NaF crystals on said submicroscopic particles of silver and, optionally, of a metal selected from the group of Au, Cu, Pd, and Pt in the unexposed portion of said article to a sufficient size to scatter visible light, and (b) to cause nucleation and growth of microcrystals of NaF containing silver halide, said halide being selected from the group of Cl, Br, and I in said exposed portion;

(4) the said exposed portion of the article is again exposed to high energy or actinic radiation;

(5) at least the exposed portion of the article is heated to a temperature between about the transformation range of the glass and the softening point thereof for a sufficient length of time to cause, in said exposed portion, metallic silver to be deposited as discrete colloidal particles less than about 200Å in the smallest dimension, and/or deposited within said microcrystals, the metal-containing part of the microcrystal being less than about 200Å in the smallest dimension, and/or deposited on the surface of said microcrystals, the portion of the microcrystal coated with metal being less than about 200Å in the smallest dimension, said microcrystals having a concentration of at least 0.005%, but less than about 0.1%, by volume, and the size thereof does not exceed about 0.1 micron in diameter, thereby being too small to scatter visible light; where the entire article is heated, further growth of the NaF crystals in the unexposed portion of the article may occur; and then (6) the article is cooled to ambient or room temperature.

The reaction mechanism underlying the development of opaque and transparent portions of the article is believed to be the same here as in the case of the simple "reverse" opals. Thus, exposure to high energy or actinic radiation effects the development of silver nuclei in addition to the metal nuclei previously developed through thermal reduction as the molten batch was cooled and shaped into a glass article. The growth of the NaF.silver halide crystallites results in competition for the available fluoride ions such that the overall growth of crystals is reduced to dimensions insufficient to scatter visible light. In general, as was indicated above, the greater the intensity and/or time of the exposure, the greater the number of silver nuclei produced through photoreduction of the silver-containing compound. Consequently, more sites are developed for subsequent crystal growth which leads to a smaller overall size of the final crystals and, hence, insures good transparency.

I have found that the method described in Ser. No. 778,160, noted above as being filed concurrently herewith, is also operable here in preparing both simple and polychromatic "reverse" opals. That is, the exposure to high energy or actinic radiation can be undertaken at the same time the glass is subjected to a specified heat treatment.

For the simple "reverse" opals, the method comprehends the following basic steps:

First, a batch of the proper composition is melted and formed into a transparent glass article in a manner to yield submicroscopic particles of a metal selected from the group of Ag, Au, Cu, Pd, and Pt dispersed therein;

Second, a portion of the article is exposed to high energy or actinic radiation while the entire article is subjected to a temperature between about 200°–410° C., preferably between about 275°–325° C.;

Third, the source of the high energy or actinic radiation is removed and the article is heated to a temperature between the transformation range of the glass and the softening point thereof; and then Fourth, the article is cooled to ambient or room temperature.

In like manner to the four-step method previously discussed above, the unexposed portion of the article will contain NaF crystals of such size as to scatter visible light, whereas the exposed portions will be transparent because the NaF crystals developed therein are of too small size to scatter visible light. Again, whereas the opal areas will commonly be white and the transparent portion essentially colorless, the use of large amounts of Ag can give rise to a yellow color, Au a blue or red tint, and Cu a red hue. Combining the exposure and heat treatment into a single operation substantially reduces the time required to achieve the desired product.

Where a polychromatic "reverse" opal is sought, two method variations are operable utilizing the invention described in Ser. No. 778,160, supra. The first of those embodiments involves:

(1) a batch of a proper composition is melted and shaped into a transparent glass article of a desired configuration having submicroscopic particles of Ag and, optionally, of a metal selected from the group of Au, Cu, Pd, and Pt dispersed therein;

(2) a portion of the article is exposed to high energy or actinic radiation while the entire article is subjected to a temperature between about 200°–410° C., preferably between about 275°–325° C.;

(3) the high energy or actinic radiation is removed and at least the exposed portion of the article is subjected to a temperature between the transformation range of the glass and the softening point thereof;

(4) the exposed portion of the article is re-exposed to high energy or actinic radiation while at least that portion is subjected to a temperature between about 200°–410° C., preferably between about 275°–325° C.; and then (5) the article is cooled to ambient or room temperature.

The second variation in method contemplates the following steps:

First, a batch of a proper composition is melted and shaped into a transparent glass article of a desired geometry having submicroscopic particles of Ag and, optionally, of a metal selected from the group of Au, Cu, Pd, and Pt dispersed therein;

Second, a portion of the glass article is exposed to high energy or actinic radiation at ambient atmosphere;

Third, the glass article is heated to a temperature between about the transformation range of the glass and the softening point thereof;

Fourth, the exposed portion of the article is re-exposed to high energy or actinic radiation while at least that portion of the article is at a temperature between about 200°–410° C., preferably between about 275°–325° C.; and then Fifth, the article is cooled to room temperature.

Both method variations yield articles wherein the unexposed portions will be opaque, normally of a white appearance, and the exposed areas will be colored due to the development of NaF.silver halide crystals with deposited silver.

In general, the glass compositions operable in the instant invention will consist essentially, in weight percent on the oxide basis, of about 10–20% $Na_2O$, 1.5–3% F, preferably 1.8–2.6%, 0.001–0.03% total of at least one metal selected from the group of Ag, Au, Cu, Pd, and Pt, 0.1–1% $Sb_2O_3$ and/or 0.01–1% SnO, the total $Sb_2O_3$ + SnO not exceeding about 1%, and the remainder $SiO_2$. Where ultra-violet radiation constitutes the actinic radiation, about 0.01–0.2% $CeO_2$ will be included in the base composition.

As was pointed out above, the environment in the melting and forming of the batch must be sufficiently reducing to develop submicroscopic particles of Ag, Au, Cu, Pd, and/or Pt. Such reducing conditions can be achieved through batch ingredients, melting atmosphere, melt thermal history, and/or combinations of the three factors. Although $Sb_2O_3$ and/or SnO are conventionally included, it may be desirable or even necessary to add such well-known thermal reducing agents as graphite, silicon, starch, and sugar to the batch to secure the development of a sufficiently reducing environment in the glass melt. Such practice is well within the skill of the glass technologist.

Where a polychromatic colored transparent portion is desired in the articles, an amount of at least one halide selected from the group of Cl, Br, and I at least sufficient to react stoichiometrically with the silver will be included, but not more than a total of about 2%.

The addition of up to about 18% ZnO and/or up to about 10% $Al_2O_3$ can be useful in improving melting and forming characteristics of the glass, the chemical durability thereof, and various physical properties of the final product. Therefore, their inclusion provides the preferred practical glass compositions of the invention.

DESCRIPTION OF PREFERRED EMBODIMENTS

The following table reports compositions, expressed in parts by weight on the oxide basis as calculated from the batch, of glasses which are operable in the instant invention. Because it is not known with which cation(s) the halides are combined, such are simply listed as the halide, in accordance with customary glass analysis practice. Furthermore, inasmuch as the content of metal is very low, these are merely tabulated as Ag, Cu, etc. Finally, since the total of the individual constituents closely approximates 100, for practical purposes each may be deemed to be recited in weight percent.

The actual batch ingredients may comprise any material, either the oxide or other compound, which, when melted with the remaining batch, will be converted into the desired oxide in the proper proportions. The metals were frequently included in the form of a halide with the remainder of the halide content being supplied as an alkali metal halide. Where $Sn^{+2}$ acts as a thermoreducing agent, it can be added to the batch in the form of a halide.

The batches recorded in the table were compounded, the ingredients ballmilled together to assist in obtaining a homogeneous melt, and then melted at about 1400°–1500° C. with stirring. Glass sheet about 0.125–0.250" thick was rolled and transferred to annealers operating at about 375°–450° C.

The loss of up to as much as 50% by weight of the halide constituents and up to as much as 30% by weight of the metal components may be experienced during melting. Nevertheless, the addition of extra amounts of those ingredients to compensate for such volatilization losses is well within the technical ingenuity of the glass technologist.

TABLE

|  | 1 | 2 | 3 | 4 | 5 | 6 | 7 | 8 | 9 |
|---|---|---|---|---|---|---|---|---|---|
| $SiO_2$ | 72.0 | 72.0 | 72.0 | 68.5 | 72.0 | 72.0 | 72.0 | 72.0 | 72.0 |
| $Na_2O$ | 16.2 | 16.2 | 16.2 | 11.8 | 16.2 | 16.2 | 16.2 | 16.2 | 16.2 |
| ZnO | 5.0 | 5.0 | 5.0 | — | 3.0 | 5.0 | 5.0 | 5.0 | 5.0 |
| $Al_2O_3$ | 6.9 | 6.9 | 6.9 | 5.1 | 6.8 | 6.9 | 6.9 | 6.9 | 6.9 |
| F | 2.5 | 2.4 | 2.4 | 2.5 | 2.8 | 2.4 | 2.4 | 2.4 | 2.4 |

TABLE-continued

|  | 1 | 2 | 3 | 4 | 5 | 6 | 7 | 8 | 9 |
|---|---|---|---|---|---|---|---|---|---|
| $CeO_2$ | 0.05 | 0.02 | 0.02 | 0.025 | 0.1 | 0.05 | 0.05 | 0.025 | 0.05 |
| Br | 1.1 | 0.1 | 0.1 | 1.1 | 0.4 | 0.1 | 0.1 | 0.1 | 0.1 |
| SnO | 0.05 | 0.1 | 0.1 | 0.03 | 0.09 | 0.08 | 0.08 | 0.05 | 0.08 |
| Ag | 0.01 | — | — | 0.01 | 0.03 | 0.01 | 0.01 | 0.01 | 0.01 |
| Cl | — | 0.4 | 0.4 | — | — | 0.4 | 0.4 | 0.4 | 0.4 |
| $Ag_2O$ | — | 0.01 | 0.01 | — | — | — | — | — | — |
| CuO | — | 0.05 | 0.05 | — | — | — | 0.01 | 0.005 | 0.005 |
| $Sb_2O_3$ | 0.2 | 0.5 | 0.5 | 0.1 | 0.25 | 0.5 | 0.5 | 0.2 | 0.5 |
| $Cu_2O$ | — | 0.05 | — | — | — | — | — | — | — |
| BaO | — | — | — | 10.2 | — | — | — | — | — |
| $K_2O$ | — | — | — | 3.5 | — | — | — | — | — |
| SrO | — | — | — | — | 2.0 | — | — | — | — |

In the following group of illustrative examples, a 1000-watt mercury vapor lamp having a peak intensity at a wavelength of about 3200Å furnished the source of ultra-violet radiation. Other sources of ultra-violet radiation can, of course, be utilized. And, as has been discussed above, high energy electrons and X-radiations are also operable to achieve photoreduction. An electrically-fired furnace was employed to conduct the recited heat treatments.

Since each of the exemplary compositions contained silver ions, the exposed portion after heat treatment exhibited polychromatic coloring.

Strips of masking tape opaque to ultra-violet radiations were placed on sections of the glass sheet running in the same direction with a slight overlap therebetween. The strips were so positioned as to divide the top surface area into seven approximately equal longitudinal portions with one of said portions being uncovered.

The glass sheets were then exposed at ambient temperature to the ultra-violet lamp at a distance of 18". After two minutes, the first tape was removed; after four minutes the second tape was removed; after six minutes the third tape was removed; after seven minutes the fourth tape was removed; after 7½ minutes the fifth tape was removed; and after eight minutes the sixth tape was removed and the ultra-violet lamp extinguished. The seventh tape was then removed.

Thereafter, the glass sheets were heated at furnace rate to 460° C. and held at that temperature for about 0.5 hour. The sheets were cooled to below the strain point of the glass and then reheated at furnace rate to a temperature of 540° C. After one hour the sheets were allowed to cool to ambient temperature.

The strip portions of the glass sheets subjected to no ultra-violet radiations exhibited a rather dense white opal appearance. The opacity became less dense in the strips subjected to increasing exposures of radiation. Thus, those strips exposed to ultra-violet radiations for six and eight minutes were virtually transparent.

Subsequently, strips of the masking tape were placed across the glass sheets at right angles to the direction followed by the first set of tapes and the sheets exposed at ambient temperature to ultra-violet radiations at a distance of 9" for 0, ½, 1, and 2 hours, respectively. The sheets were heated at furnace rate to 460° C., maintained thereat for 20 minutes, and then cooled to room temperature.

In general, a spectrum of colors was developed in like manner to that described in Ser. No. 646,259, supra. Hence, the section having no initial exposure to radiation maintained the same degree of opacity upon further treatment and exhibited a pale yellow coloration in those areas subjected to the second exposure and heat treatment. Those sections receiving relatively short initial exposures to ultraviolet radiations remained translucent-to-opaque and those portions receiving longer exposures maintained their transparency after the second exposure and heat treatment. And the colors ranged from shades of green at the shorter exposures through blues to reds to yellows as the exposures increased in time.

As can be appreciated, a similarly variegated appearance can be achieved in the above exemplary compositions utilizing the method described and claimed in Ser. No. 778,160, supra, i.e., conducting the exposure to high energy or actinic radiation simultaneously with the heat treatment.

I claim:

1. A method for making a glass article wherein a portion thereof exhibits opacity and a portion thereof is transparent which comprises the steps:
   (a) melting a batch under reducing conditions for a glass consisting essentially, in weight percent on the oxide basis as calculated from the batch, of about 10–20% $Na_2O$, 1.5–3% F, 0.001–0.03% total of at least one metal selected from the group consisting of Ag, Au, Cu, Pd, and Pt, 0.1–1% $Sb_2O_3$ and/or 0.01–1% SnO, the total $Sb_2O_3$ + SnO not exceeding about 1%, and the remainder $SiO_2$;
   (b) forming said melt into a transparent glass article containing submicroscopic particles of at least one metal selected from the group of Ag, Au, Cu, Pd, and Pt dispersed therein;
   (c) exposing a portion of said article to high energy or actinic radiation at ambient temperature to develop a transparent latent image therein containing a large number of metal nuclei;
   (d) heating said glass article to a temperature between about the transformation range of the glass and the softening point thereof for a sufficient length of time to cause nucleation and growth of microcrystals of NaF in said exposed portion of said article of insufficient size to scatter visible light, and the growth of NaF crystals on said submicroscopic particles of at least one metal selected from the group consisting of Ag, Au, Cu, Pd, and Pt in that portion of said article not exposed to high energy or actinic radiation of such size as to scatter visible light and impart opacity thereto, whereby said exposed portion of said article is transparent and said portion of said article not exposed to high energy or actinic radiation is opaque; and then
   (e) cooling said article to ambient temperature.

2. A method according to claim 1 wherein said actinic radiation consists of ultra-violet radiation having wavelengths between about 2800Å–3500Å.

3. A method according to claim 2 wherein said glass also contains about 0.01–0.2% $CeO_2$.

4. A method according to claim 1 wherein said glass also contains up to 18% ZnO and/or up to 10% $Al_2O_3$.

5. A method according to claim 1 wherein said NaF crystals in said portion of said article not exposed to high energy or actinic radiation are about 1–10 microns in diameter.

6. A method according to claim 1 wherein said opacity is white in color.

7. A method for making a glass article wherein a portion thereof exhibits opacity and a portion thereof is transparent and integrally colored which comprises the steps:
   (a) melting a batch under reducing conditions for a glass consisting essentially, in weight percent on the oxide basis as calculated from the batch, of about 10–20% Na$_2$O, 1.5–3% F, 0.001–0.03% total of Ag and, optionally, at least one metal selected from the group consisting of Au, Cu, Pd, and Pt, an amount of at least one halide selected from the group consisting of Cl, Br, and I at least sufficient to react stoichiometrically with said Ag, but not more than about 2% total, 0.1–1% Sb$_2$O$_3$ and/or 0.01–1% SnO, the total Sb$_2$O$_3$ + SnO not exceeding about 1%, and the remainder SiO$_2$;

(b) forming said melt into a transparent glass article having submicroscopic particles of Ag and, optionally, of at least one metal selected from the group of Au, Cu, Pd, and Pt dispersed therein;

(c) exposing a portion of said article to high energy or actinic radiation at ambient temperature to develop a transparent latent image therein containing a large number of metal nuclei;

(d) heating said glass article to a temperature between about the transformation range of the glass and the softening point thereof for a sufficient length of time to cause nucleation and growth of microcrystals of NaF containing silver halide, said halide being selected from the group consisting of Cl, Br, and I, in said exposed portion of said article of insufficient size to scatter visible light, and the growth of NaF crystals on said submicroscopic particles of Ag and, optionally, at least one metal selected from the group consisting of Au, Cu, Pd, and Pt in that portion of said article not exposed to high energy of actinic radiation of such size as to scatter visible light and impart opacity thereto, whereby said exposed portion of said article is transparent and said portion of said article not exposed to high energy or actinic radiation is opaque;

(e) exposing said previously-exposed portion of said article to high energy or actinic radiation while at least that portion is at a temperature between about 200°–410° C. for a sufficient length of time to cause, in said exposed portion, Ag to be deposited as discrete colloidal particles less than 200A in the smallest dimension, and/or deposited within said microcrystals, the Ag-containing part of the microcrystal being less than about 200A in the smallest dimension, and/or deposited on the surface of said microcrystals, the portion of the microcrystal coated with Ag being less than about 200A in the smallest dimension, said microcrystals having a concentration of at least 0.005%, but less than about 0.1%, by volume and the size thereof not exceeding about 0.1 micron in diameter, whereby color is produced in said exposed portion of said article; and then (f) cooling said article to ambient temperature.

8. A method according to claim 7 wherein said actinic radiation consists of ultra-violet radiation having wavelengths between about 2800Å–3500Å.

9. A method according to claim 8 wherein said glass also contains about 0.01–0.2% CeO$_2$.

10. A method according to claim 7 wherein said glass also contains up to about 18% ZnO and/or up to about 10% Al$_2$O$_3$.

11. A method according to claim 7 wherein said exposure of step e, the previously-exposed portion of said article is conducted at a temperature between about 275°–325° C.

12. A method according to claim 7 wherein said NaF crystals in said portion of said article not exposed to high energy or actinic radiation are about 1–10 microns in diameter.

13. A method according to claim 7 wherein said opacity is white in color.

14. A method according to claim 8 wherein said transparent and integrally colored portion of said glass article is polychromatic.

15. A method for making a glass article wherein a portion thereof exhibits opacity and a portion thereof is transparent which comprises the steps:

(a) melting a batch under reducing conditions for a glass consisting essentially, in weight percent on the oxide basis as calculated from the batch, of about 10–20% Na$_2$O, 1.5–3% F, 0.001–0.03% total of at least one metal selected from the group consisting of Ag, Au, Cu, Pd, and Pt, 0.1–1% Sb$_2$O$_3$ and/or 0.01–1% SnO, the total Sb$_2$O$_3$ + SnO not exceeding about 1%, and the remainder SiO$_2$;

(b) forming said melt into a transparent glass article containing submicroscopic particles of at least one metal selected from the group of Ag, Au, Cu, Pd, and Pt dispersed therein;

(c) exposing a portion of said article to high energy or actinic radiation while the entire article is heated to a temperature between about 200°–410° C. for a sufficient length of time to cause nucleation and growth of microcrystals of NaF in said exposed portion of the article of insufficient size to scatter visible light, and the growth of NaF on said submicroscopic particles of at least one metal selected from the group of Ag, Au, Cu, Pd, and Pt in said unexposed portion of said article to a sufficient size to scatter visible light, whereby said exposed portion of said article is transparent and said unexposed portion of said article is opaque; and then (d) cooling said article to ambient temperature.

16. A method according to claim 15 wherein said actinic radiation consists of ultra-violet radiation having wavelengths between about 2800Å–3500Å.

17. A method according to claim 16 wherein said glass also contains about 0.01–0.2% CeO$_2$.

18. A method according to claim 15 wherein said glass also contains up to about 18% ZnO and/or up to about 10% Al$_2$O$_3$.

19. A method according to claim 15 wherein said exposure is conducted at a temperature between about 275°–325° C.

20. A method according to claim 15 wherein said NaF crystals in said portion of the article not exposed to high energy or actinic radiation are about 1–10 microns in diameter.

21. A method according to claim 15 wherein said opacity is white in color.

22. A method for making a glass article wherein a portion thereof exhibits opacity and a portion thereof is transparent and integrally colored which comprises the steps:

(a) melting a batch under reducing conditions for a glass consisting essentially, in weight percent on the oxide basis as calculated from the batch, of about 10–20% Na$_2$O, 1.5–3% F, 0.001–0.03% total of Ag and, optionally, at least one metal selected from the group consisting of Au, Cu, Pd, and Pt, an amount of at least one halide selected from the group consisting of Cl, Br, and I at least sufficient to react stoichiometrically with said Ag, but not more than about 2% total, 0.1–1% Sb$_2$O$_3$ and/or 0.01–1% SnO, the total Sb$_2$O$_3$ + SnO not exceeding about 1%, and the remainder SiO$_2$;

(b) forming said melt into a transparent glass article having submicroscopic particles of Ag and, optionally, of at least one metal selected from the group of Au, Cu, Pd, and Pt dispersed therein;

(c) exposing a portion of said article to high energy or actinic radiation at ambient temperature to develop a transparent latent image therein containing a large number of metal nuclei;

(d) heating said glass article to a temperature between about the transformation range of the glass and the softening point thereof to cause nucleation and growth of microcrystals of NaF containing silver halide, said halide being selected from the group consisting of Cl, Br, and I, in said exposed portion of said article of insufficient size to scatter visible light, and the growth of NaF crystals on said submicroscopic particles of Ag and, optionally, at least one metal selected from the group consisting of Au, Cu, Pd, and Pt in that portion of said article not exposed to high energy or actinic radiation of such size as to scatter visible light and impart opacity thereto, whereby said exposed portion of said article is transparent and said portion of said article not exposed to high energy or actinic radiation is opaque;

(e) exposing said previously-exposed portion of said article to high energy or actinic radiation at ambient temperature;

(f) heating at least said exposed portion of of said article to a temperature between about the transformation range of the glass and the softening point thereof for a sufficient length of time to cause, in said exposed portion, Ag to be deposited as discrete colloidal particles less than 200Å in the smallest dimension, and/or deposited within said microcrystals, the Ag-containing part of the microcrystal being less than about 200Å in the smallest dimensions, and/or deposited on the surface of said microcrystals, the portion of the microcrystal coated with Ag being less than about 200Å in the smallest dimension, said microcrystals having a concentration of at least 0.005%, but less than about 0.1%, by volume and the size thereof not exceeding about 0.1 micron in diameter, whereby color is produced in said exposed portion of said article; and then (g) cooling said article to ambient temperature.

23. A method according to claim 22 wherein said actinic radiation consists of ultra-violet radiation having wavelengths between about 2800Å–3500Å.

24. A method according to claim 23 wherein said glass also contains about 0.01–0.2% CeO$_2$.

25. A method according to claim 22 wherein said glass also contains up to about 18% ZnO and/or up to about 10% Al$_2$O$_3$.

26. A method according to claim 22 wherein said NaF crystals in said portion of said article not exposed to high energy or actinic radiation are about 1–10 microns in diameter.

27. A method according to claim 22 wherein said opacity is white in color.

28. A method according to claim 22 wherein said transparent and integrally colored portion of said glass article is polychromatic.

29. A method for making a glass article wherein a portion therein exhibits opacity and a portion thereof is transparent and integrally colored which comprises the steps:

(a) melting a batch under reducing conditions for a glass consisting essentially, in weight percent on the oxide basis as calculated from the batch, of about 10–20% Na$_2$O, 1.5–3% F, 0.001–0.03% total Ag and, optionally, at least one metal selected from the group consisting of Au, Cu, Pd, and Pt, an amount of at least one halide selected from the group consisting of Cl, Br, and I at least sufficient to react stoichiometrically with said Ag, but not more than about 2% total, 0.1–1% Sb$_2$O$_3$ and/or 0.01–1% SnO, the total Sb$_2$O$_3$ + SnO not exceeding about 1%, and the remainder SiO$_2$;

(b) forming said melt into a transparent glass article containing submicroscopic particles of Ag and, optionally, at least one metal selected from the group of Au, Cu, Pd, and Pt dispersed therein;

(c) exposing a portion of said article to high energy or actinic radiation while the entire article is heated to a temperature between about 200°–410° C. to develop a transparent latent image therein containing a large number of metal nuclei;

(d) removing said high energy or actinic radiation and heating said glass article to a temperature between about the transformation range of the glass and the softening point tereof for a sufficient length of time to cause nucleation and growth of microcrystals of NaF containing silver halide, said halide being selected from the group consisting of Cl, Br, and I, in said exposed portion of the article of sufficient size to scatter visible light, and the growth of NaF crystals on said submicroscopic particles of Ag and, optionally, at least one metal selected from the group consisting of Au, Cu, Pd, and Pt in that portion of said article not exposed to high energy or actinic radiation of such size as to scatter visible light and impart opacity thereto, whereby said exposed portion of said article is transparent and said portion of said article not exposed to high energy or actinic radiation is opaque;

(e) exposing said previously-exposed portion of said article to high energy or actinic radiation while at least that portion of the article is heated to a temperature between about 200°–410° C. for a sufficient length of time to cause, in said exposed portion, Ag to be deposited as discrete colloidal particles less than 200Å in the smallest dimension, and/or deposited within said microcrystals, the Ag-containing part of the microcrystal being less than about 200Å in the smallest dimensions, and/or deposited on the surface of said microcrystals, the portion of the microcrystal coated with Ag being less than about 200Å in the smallest dimension, said microcrystals having a concentration of at least 0.005%, but less than about 0.1%, by volume and the size thereof not exceeding about 0.1 micron in diameter, whereby color is produced in said exposed portion of said article; and then (f) cooling said article to room temperature.

30. A method according to claim 29 wherein said actinic radiation consists of ultra-violet radiation having wavelengths between about 2800Å–3500Å.

31. A method according to claim 30 wherein said glass also contains about 0.01–0.2% CeO$_2$.

32. A method according to claim 29 wherein said glass also contains up to about 18% ZnO and/or up to about 10% Al$_2$O$_3$.

33. A method according to claim 29 wherein said exposures of steps c and e are conducted at a temperature between about 275°–325° C.

34. A method according to claim 29 wherein said NaF crystals in said portion of the article not exposed to high energy or actinic radiation are about 1–10 microns in diameter.

35. A method according to claim 29 wherein said opacity is white in color.

36. A method according to claim 29 wherein said transparent and integrally colored portion of said glass article is polychromatic.

* * * * *